Dec. 25, 1956  F. E. STIRN ET AL  2,775,080
METHOD OF FORMING POWDER-AND-LIQUID FILLED CAPSULES
Filed May 26, 1950  5 Sheets-Sheet 1

Fig. 1.

INVENTORS
FRANK E. STIRN,
ARTHUR S. TAYLOR,
BY
Samuel Branch Walker
ATTORNEY

Dec. 25, 1956 F. E. STIRN ET AL 2,775,080
METHOD OF FORMING POWDER-AND-LIQUID FILLED CAPSULES
Filed May 26, 1950 5 Sheets-Sheet 2

INVENTORS
FRANK E. STIRN,
ARTHUR S. TAYLOR,
BY
Samuel Branch Walker
ATTORNEY Dec. 25, 1956    F. E. STIRN ET AL    2,775,080
METHOD OF FORMING POWDER-AND-LIQUID FILLED CAPSULES
Filed May 26, 1950    5 Sheets-Sheet 3

INVENTORS
FRANK E. STIRN,
ARTHUR S. TAYLOR,
BY
Samuel Branch Walker
ATTORNEY

Dec. 25, 1956 F. E. STIRN ET AL 2,775,080
METHOD OF FORMING POWDER-AND-LIQUID FILLED CAPSULES
Filed May 26, 1950 5 Sheets-Sheet 4

INVENTORS
FRANK E. STIRN,
ARTHUR S. TAYLOR,
BY
Samuel Branch Walker
ATTORNEY Dec. 25, 1956  F. E. STIRN ET AL  2,775,080
METHOD OF FORMING POWDER-AND-LIQUID FILLED CAPSULES
Filed May 26, 1950  5 Sheets-Sheet 5

INVENTORS
FRANK E. STIRN,
ARTHUR S. TAYLOR,
BY
Samuel Branch Walker
ATTORNEY

United States Patent Office 2,775,080
Patented Dec. 25, 1956

2,775,080

METHOD OF FORMING POWDER-AND-LIQUID FILLED CAPSULES

Frank Edwin Stirn, Pearl River, and Arthur Sinclair Taylor, Spring Valley, N. Y., assignors to American Cyanamid Company, New York, N. Y., a corporation of Maine Application May 26, 1950, Serial No. 164,426

4 Claims. (Cl. 53—26)

This invention relates to improvements in a method and a mechanism for forming and filling capsules from deformable strip materials, such as soft gelatin, which capsules may be filled with a powder and a liquid simultaneously, or the powder alone; and which capsules are formed of a symmetrical configuration by an essentially asymmetric process.

It is an object of this invention to provide a method, and a machine for practicing the method, whereby a powder is filled into a charge chamber in a measuring roll and therein compacted, held, and retained by vacuum, transferred from such chamber into a deformable strip material lined cavity in a die roll, to which a liquid may be added before or after the powder is transferred thereto. The lined cavity containing the powder charge with any desired associated quantity of liquid is then covered by a second strip of a deformable strip material, and the two portions fastened together and joined by a pressure seal caused by cutting out the two strips simultaneously, thereby forming a capsule with a flat top. The thus formed capsule is then ejected from the forming cavity and permitted to assume a desired shape.

It is an object of this invention to provide a coater, whereby either or both sides of the strip material may be coated with the same or different materials; and to provide a system where either or both strips may be so coated.

It is an additional object of this invention to provide a cavity die roll which is convenient to assemble, accurate in operation, and has a long life in production.

It is a still further object of this invention to provide a liquid feed method whereby a liquid is fed at a substantially uniform rate into the capsule-forming mechanism, and because it is fed at a uniform rate, and the capsules are formed at a uniform rate, a uniform charge of the liquid is fed into and enclosed in each capsule without the inconvenience of measuring every charge to every capsule.

It is a yet further object of this invention to provide a means whereby powder measuring roll charge chambers may be kept clean by the use of gas jets and a vacuum system, so that any powder which may remain in the chambers is removed and ejected without the dust thereby raised escaping into the filling room.

It is yet a further object of this invention to provide a means whereby the capsules, as ejected from the cavities in the cavity die wheel in which they are formed, are uniformly and completely ejected without being allowed to be retained in the gelatin web which is residual, or without being allowed to be kept in the cavities too long; and upon being ejected, are picked up by an air conveyor system, whereby they are transferred rapidly and uniformly to any desired location, and which system has the further advantage of serving as a test of the strength of the seal, because of the comparatively turbulent transportation of the capsules.

A particular object of this invention is to provide a means and a method where a single machine is provided which will permit the formation of symmetric capsules, which capsules may contain both a powder and a liquid in any desired proportion, and the filling of which is independently controlled. In the past, it has been customary to fill capsules with a liquid or a paste, i. e., a liquid in which solid particles are suspended; and it has been necessary to have sufficient of the liquid present so that the paste could be pumped and handled as a liquid, rather than as a solid. By this our invention, we have found that it is possible to handle the two separately, and fill the powder individually into the cavities in such quantities as may be desired, independent of the amount of liquid which is being filled.

Also, in the past, it has been considered necessary that each cavity receive its own charge of liquid by an individual action of a pump, whereby each capsule cavity has a certain volume of a liquid resulting from the ejection by positive displacement into the cavity as such. We have found that by having a series of capsule-forming cavities, each lined with the capsule shell material, passing at a substantially uniform rate, underneath and adjacent to a liquid-filling nozzle, and by having the liquid discharged through the nozzle at a constant rate, the liquid will fill uniformly into the individual capsule-forming cavities, and that the charges retained therein will be extremely consistent and well within conventional tolerances. As strange as it seems, the uniformity of charges attained by this method is at least as great as that attained by the individual measurement of the charges for the individual capsules.

In the past, capsules of this nature have been formed almost exclusively from soft gelatin, a plasticized mixture of gelatin, glycerin, and water, together with such coloring, flavoring, and odors as may be desired. We have found that our machine and method work satisfactorily if the gelatin strip is plasticized with a polyethyleneoxide, in addition to, or instead of, the glycerin; and we have found that various gelatin substitutes may be used in conjunction with the machine. Whereas the machine at present has its greatest commercial utility in the formation of gelatin capsules, as raw materials fluctuate in price, the use of gelatin substitutes rather than gelatin itself is an economic problem, and our machine is adapted for the use of such substitutes. Because the commercial demand today requires pharmaceutical capsules of gelatin rather than a substitute for the gelatin, our machine will be described in connection with the use of gelatin films for which today's markets find the greatest demand; but it is to be understood that other strip materials may be used, when, as, and if the market and price considerations render them economically expedient.

It is a further advantage of our machine that means are provided whereby the interior of the capsule may be coated with a protective material to protect the gelatin from the contents of the capsule, or the contents of the capsule from the gelatin, if desired. Such protection is sometimes necessary when the contents of the capsule are of a highly hygroscopic nature, and the moisture in the capsule gelatin would otherwise have a deleterious effect upon the hygroscopic powder contained.

Of course, if materials other than gelatin are used, the dispersing medium may be other than water, and under such circumstances, depending upon the contents of the capsule, different materials may be necessary to protect the various portions from each other.

Additionally, the entire operation can be carried out in an inert atmosphere as, for example, nitrogen, if the moisture or the oxygen of the normal atmosphere would have a deleterious influence on the contents of the capsule. These, and other objects of the invention will be apparent from the description in detail appearing in the following specification and in the accompanying drawings, which set forth by way of example certain embodiments of the invention covered by our appended claims.

Figure 14:
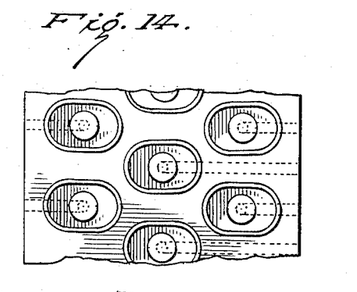
Figure 14 is a view of the surface of a cavity die roll in a modification in which comparatively short oval capsules are formed and with but a single capsule ejector plug.
Figure 15:
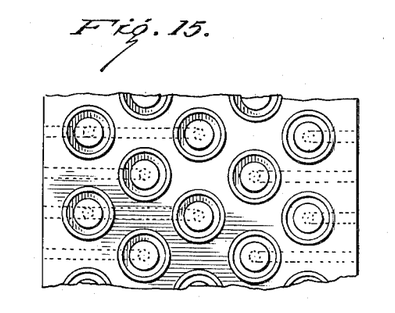
Figure 15 is a view of the surface of the cavity die roll in another modification showing round capsule cavities with a single capsule ejector plug.

The size and shape of the completed capsule are a matter within the discretion of the designer. The capsules may be round, elliptical, or may be the so-called long oval, which consists of a cylindrical portion with two hemispherical ends. This latter shape is one which in the past has been the most difficult to form, and one which is most useful, because the diameter, taken crosswise, is a minimum for the contents, so that a comparatively large capsule volume is contained in a capsule which may be swallowed, as the diameter of the capsule, rather than its length, determines the ease with which it may be swallowed. Because in the past, the greatest difficulty has been found in trying to get the so-called "long ovals" to come out without bends, bows, or unsymmetrical configurations, and because a description of such a long oval machine will explain how, with a minimum of adaptation, other shapes may be formed, the long oval machine will be described in detail and its adaptations into other forms and shapes such as shown in Figures 14 and 15 will be readily understood by those skilled in the art without detailed descriptions.

Whereas the machine may be used with any plastic material the strips of which will seal to each other when cut with a blunt-edged cutter, we shall describe the machine particularly in conjunction with a soft gelatin composition, such as is currently desired for therapeutic purposes. The machine, as described here in detail, is perfectly satisfactory for the preparation of multi-vitamin compositions, particularly those in which such vitamins as vitamin A and vitamin D are used in combination with such as thiamin, riboflavin, niacinamide, calcium pantothenate, pyridoxine, ascorbic acid, folic acid and/or other materials. Of these, vitamin A and vitamin D are most easily handled in an oily solution, and the others are usually most easily handled in a powdered form. In the machine herein described, the vitamin A and vitamin D, etc. may be incorporated in an oil. The solid constituents may be combined as powdered materials and added as a fine impalpable powder, thereby forming a combination capsule in which each individual capsule has present the desired quantities of both a powder and a liquid. It is to be understood that, if desired, the liquid portion may be so small as to be negligible or may be completely omitted without its interfering with the formation of the capsules and their powdered contents. In this connection, it may be mentioned that air filled capsules may be easily formed by our machines and, normally are formed during the starting operation, in which the gelatin sheets are first fed into the machine flat, and then the vacuum applied, thereby causing the formation of empty capsules with nothing but air in them; then the oil is adjusted, and then the powder adjusted, thus giving the final form of filled capsule with all of the desired ingredients. The concentration of the medicament in the oil or powder fill may be adjusted with a diluent so that the capsule is completely filled, or the capsule may be partially filled, leaving air in the remainder, whereby uniform sized capsules may be formed with any desired variation in therapeutic contents. With this brief summary of its method of operation, we shall now proceed to describe in detail, in connection with the drawings, the construction and a method of operation of a particular embodiment of our invention.

The machine will be described with the parts in the order in which they act upon the gelatin film.

*Coater*

Figure 1:
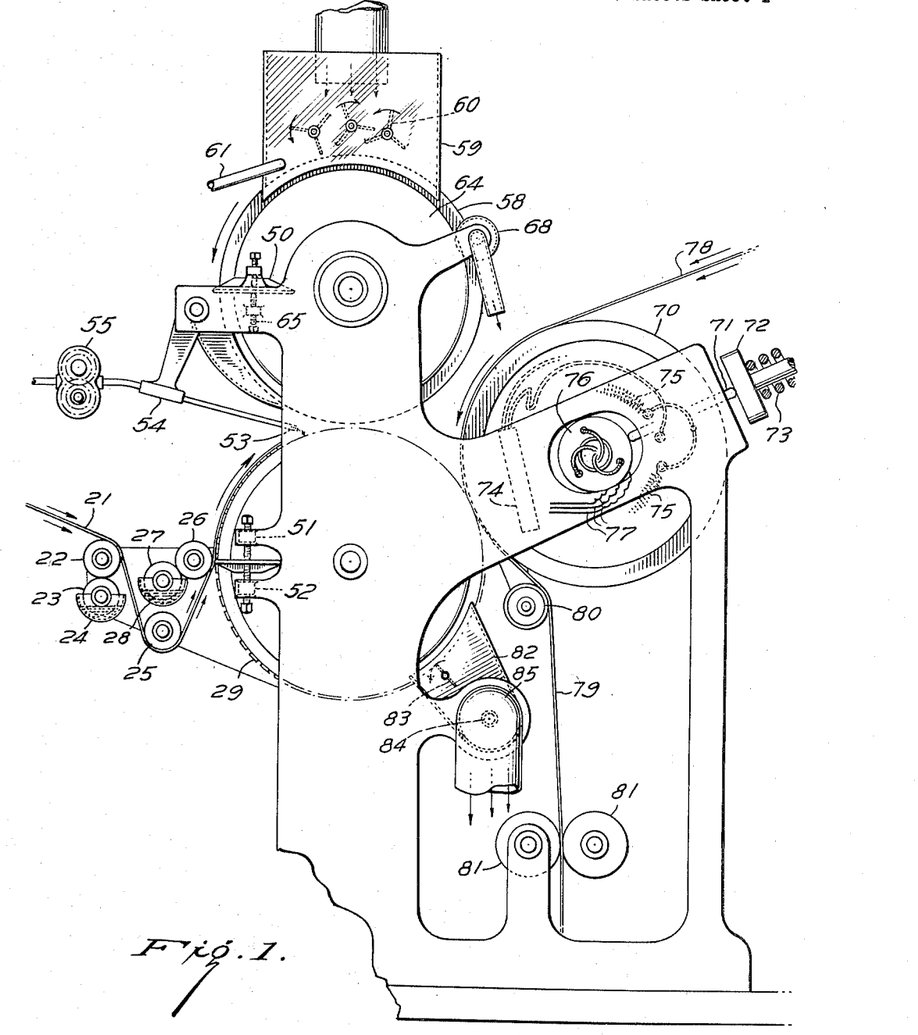
Figure 1 is a side elevation of substantially the entire capsule filling machine. The deformable strip forming means is not shown in this figure, as such is not part of the present invention.

The lower film 21, as shown in Figure 1, is fed from the left and over the oiler roll 22. The oil roll is, in turn, kept oiled with its contact with an oil feed roll 23, which rotates partially submerged in an oil bath 24. A standard form of constant level device may be used to maintain the oil at a constant level and, depending upon level and viscosity, the rate of feed may be varied. For normal operating purposes, a mineral oil, such as is designed for therapeutic purposes, may be used. If the oil is too thick, it may be thinned with a solvent such as ligroin, to insure that its viscosity is, as desired. After passing over the oiler roll, the film passes under positioning roll 25 and to an inside coating roll 26, which inside coating roll, in turn, contacts an inside coating feed roll 27, which inside coating feed roll rotates partially submerged and in inside coating trough 28. This inside coating trough may be kept filled to a constant liquid level by a constant level feed device.

Normally, the inside coating is one which is designed to protect the film and the capsule from each other. With gelatin films and vitamins, this coating may consist of a gum or shellac, such as confectioner's lac, or gum sandarac, gum mastic, or other substantially waterproof gum. The solvents may be such as chloroform, ether, carbon tetrachloride, or a mixture, or it may be a petroleum base, such as petroleum and ether, or ligroin. The liquid level and dilution may be varied to change the thickness of the deposited coating, or additional transfer rolls used. If the contents of the capsule are to be of of innocuous material, these rollers may be disconnected and the uncoated gelatin film fed to the machine.

For thin films it is usually desirable that all of the strip contacting rolls be power driven to avoid stresses in the film. Any conventional drive means, not shown, may be used to turn these rolls so the surface speed is the same as the desired rate of strip travel at the point.

The film next contacts the cavity die roll.

Cavity die roll

Figure 2:
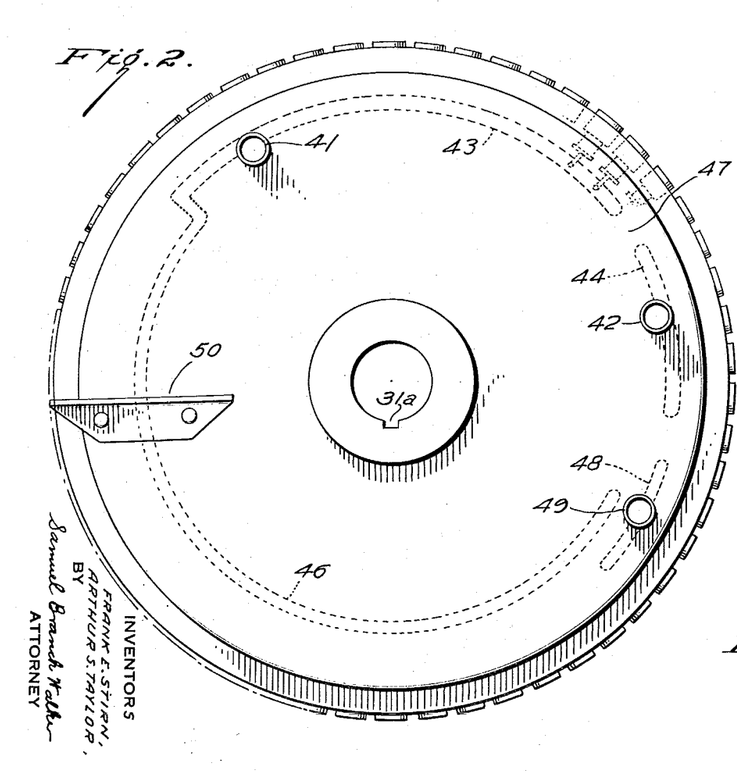
Figure 2 is an elevation view in detail of a cavity die roll, showing the valve plates in connection therewith.
Figure 3:
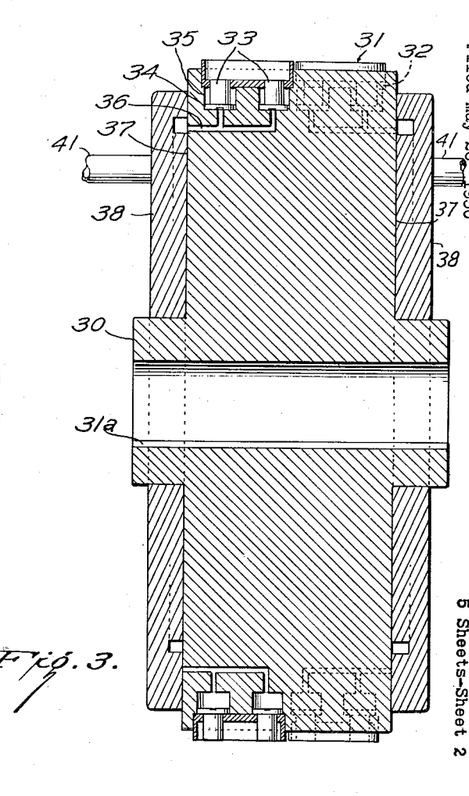
Figure 3 is a sectional view through the cavity die roll, showing certain features of its construction, and its relationship with the valve plates.

The cavity die roll itself 29 may be seen in relationship with the other parts of the machine in Figure 1, and enlarged views, Figures 2 and 3. Certain details of the roll and its mode of operation may be more clearly seen in Figures 4, 5 and 6.

The die roll itself may be of integral or built-up construction; and may be constructed in various ways equivalent to that shown. In the particular modification shown, the cavity die roll consists of a cavity die roll blank 30, which is machined from a single piece of material. This blank has a hub with an opening for an axle with a suitable means such as a keyway 31a for fastening the cavity die roll itself upon the shaft. Set screws or other fastening means may be used; or the wheel may be permitted to turn upon this shaft if driven by a suitable means. The cavity die roll has, around its periphery, a series of capsule caviety inserts 31, which fit into insert slots 32 cut in the surface of the cavity die roll blank. Underneath the capsule cavity inserts, at the bottom of the insert slots is at least one capsule ejector plug 33, which has integral therewith a capsule ejector piston 34, which piston fits in the capsule ejector piston cylinder 35, called the piston cylinder. One end of the piston cylinder is connected by a manifold 36 to the valve seat surface 37 of the cavity die roll blank. Adjacent to this valve seat surface is the valve plate 38.

Figure 6:
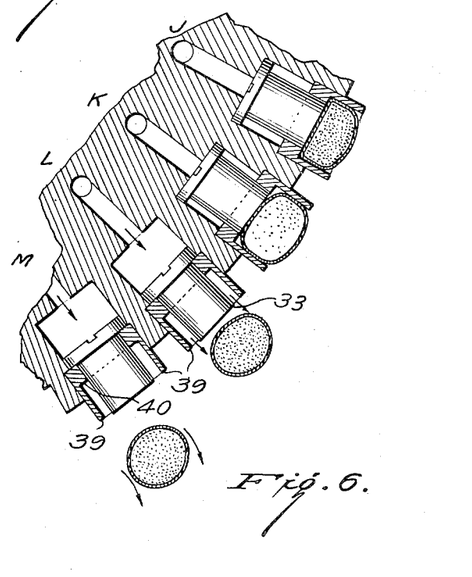
Figure 6 is a sectional view of a portion of the cavity die roll at the point where the capsules are ejected, showing the action which there occurs.
Figure 7:
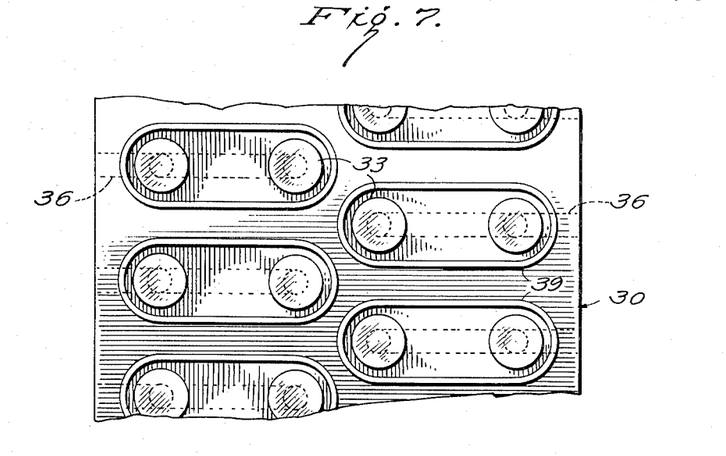
Figure 7 is a surface view of a portion of the cavity die roll, showing the arrangement of the various cavities on the surface of the roll and certain of the details of the capsule cavity inserts, the capsule ejector plugs, and the capsule ejector manifolds.

In more detail, capsule cavity inserts 31 are shaped something like a bathtub in general configuration. They have a cutting rim 39 as shown in Figures 6 and 7 which consist of two semi-cylindrical end portions connected by straight portions, and a bottom 40. The capsule cavity inserts are individually formed. The rim thickness may be approximately that of the film upon which they work. From ½ to 1½ times the film thickness is a useful operating range. The depth of each of the capsule cavity inserts may be such that the periphery around the capsule as formed in the insert is approximately the same as around the end of the capsule cavity insert, and the thickness of the bottom is preferably considerably greater for rigidity but may be varied depending upon the materials of construction. The dimensions are not critical, and may vary over wide limits, depending upon the size and shape of capsules desired.

Through the bottom of the capsule cavity inserts, there are holes of sufficient size to hold the capsule ejector plugs 33. The portion of the plug which extends into the capsule cavity insert may be of such length that it will extend to at least approximately the top of the capsule cavity insert when in raised position. In manufacture, the capsule cavity inserts are cut to have a greater depth than that finally desired, and may be cut from rectangular stock. They may be of a tool steel, or other hard material, so as to give a superior life to the finished cavity die roll. The insert slots should be slightly smaller than the size of the outside of the capsule cavity inserts, so that they may be pressed therein and firmly retained through the life of the cavity die roll. Other retaining means may be used but unduly complicate the problem of construction. At the bottom of the slot, before inserting the capsule cavity insert, is cut the capsule ejection piston cylinder. It may be seen that the relative spacing on this is comparatively important for final assembly. The depth of this cylinder is such that the piston which slides therein is concentric with the end of the capsule ejector plug, and will slide so that in its lower position, the top of the plug is approximately level with the bottom of the cavity insert; and at the top of its stroke, the end of the plug is near the top of the cavity as shown in Figure 6. Beneath each piston there is a manifold passage 36 connected to the valve seat surface 37, as shown in Figure 3 and elsewhere. The bottom of the capsule ejector piston should have a slot or serration therein, so that it does not seat against the top of this manifold passage in the bottom of the piston and form an air-tight seal; the slot, of course, may be in the bottom of the cylinder rather than in the piston itself.

In construction, it is most convenient to first form the cavity die roll blank with all of the insert slots; then into each piston cylinder drop the piston and plug, then press in the capsule cavity insert. After the complete series of inserts are assembled, the surface of the cavity die roll may be ground so that each cutting out rim 39 is cut to the same height, and as part of the cylindrical surface of the roll. Accuracy is required in the construction, because the cutout of the individual capsules is by this rim being forced against the seal rolls, and variations in radius may give a defective cut-out.

The piston should fit loosely in its cylinder, and the plug should fit loosely in the hole at the bottom of the capsule cavity insert, so that the vacuum which operates through the manifold can act past the piston, past the plug, and upon the gelatin strip which is on the surface of the cavity die roll. It is very important that this clearance be sufficient that the vacuum can act upon the gelatin strip and leave sufficient clearance to prevent binding and to prevent any powder, etc. from clogging the mechanisms.

In construction, an interference between at least parts of the capsule cavity insert and the insert slot in the neighborhood of from .002–.005" is very satisfactory when the cavity die roll blank is formed from a high grade brass or bronze and the inserts are formed from steel, either annealed or hardened. An adequate effect of vacuum can usually occur if there is clearance in the neighborhood of from .004–.010 around the piston and its cylinder, and between the plug and the hole in the bottom of the insert in which it slides.

If the insert slot is lightly longer than the cavity insert, the holding action on the sides is sufficient to retain the assembly in position. A slight leakage around the outside of the cavity inserts may even be an advantage if the strip is wide enough to lap over the ends of the cutting out rims, and contact the roll surface proper, as then the vacuum can act on the strip between the inserts, and more firmly retain it in position.

Figures 11, 12:
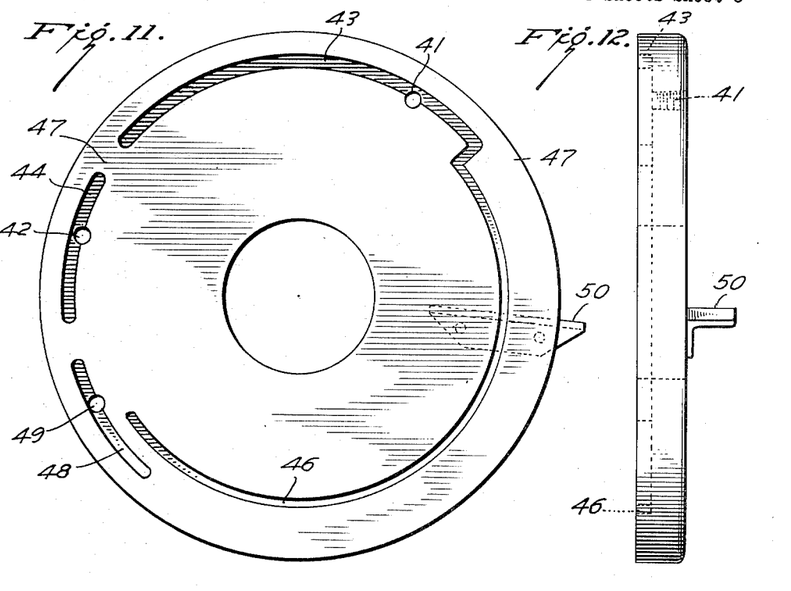
Figure 11 shows the face of the cavity die roll valve plate.
Figure 12 shows a side elevation of the cavity die roll valve plate.

The valve plate 38 slides upon the valve seat surface of the cavity die roll. As shown in Figure 3, there is a valve plate on each side of the particular rolls here shown. These are symmetrical and their function the same. All cavities could be manifolded to a single side, if desired. One of these valve plates is shown in Figures 11 and 12. These slide on the hub of the cavity die roll blank and against the face of the cavity die roll valve surface. Springs may be used to aid in positioning these plates, but normally the vacuum used during the operation of the machine is sufficient to hold these plates tightly against the surface of the cavity die roll valve seat surfaces.

As shown in Figure 2, two vacuum leads connect with the two vacuum chest portions of this plate. The vacuum connections are shown at 41 and 42, and the vacuum chests at 43 and 44, respectively. The vacuum chest 43 connects to a balancing chamber 46 so as to give a balanced action of the vacuum and to hold the plate smoothly against the surface of the cavity die roll throughout its entire periphery. The valve plate may be of molded plastic such as Micarta, or of metal. Portions of the plate may be cut away to cut down on the sliding areas to reduce friction.

The first chest 43 controls the ejector plugs and holds them down against the bottom of the cylinder throughout the top of the arc of the cavity die roll. There is a gap, as shown at 47, between the two vacuum chests, so that there is no vacuum acting on the strip at the time of formation of the seal, as will be described in detail later. At the ejector point, there is a pressure chest 48 connected to a pressure line 49. As described later, the air pressure raises the plugs to the top of their travel, thereby ejecting the formed capsules, and causing their release from the cavity die roll. In operation, the valve plate is prevented from rotating by a valve plate positioning bracket 50. This bracket consists of an angle extending from the plate. It is anchored between two screws, 51 and 52, which act as a valve plate positioning screw upper and valve plate positioning screw lower, whereby the position of the valve plate may be micrometrically adjusted, so that the machine operates most efficiently.

Figure 4:
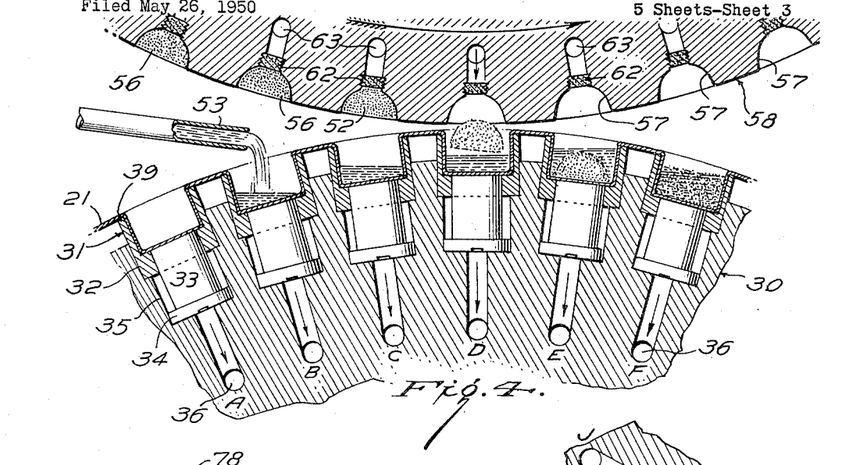
Figure 4 is an enlarged portion of both the cavity die roll and the powder measuring roll, showing their operation at the point of fill.

In operation, the film, passing under the inside coating roll, next passes adjacent to, and rests upon the raised rims of the capsule cavity inserts. When the openings of the manifold 36 come in contact with the vacuum chests 43, the vacuum pulls down the pistons, the plugs, and because of the loose fit, the entire film. Air pressure forces the gelatin film or strip down into the capsule cavity and the piston is drawn down against the bottom of its cylinder, so that the top of the plug is substantially level with the bottom of the capsule cavity, and the entire cavity is smoothly and uniformly lined with the stretched gelatin strip. The gelatin-lined capsule cavity in this condition is shown in Figure 4 at operating position A. The gelatin film slides smoothly and uniformly down into the capsule forming cavity, and is held firmly in position there.

Liquid feed

As the gelatin lined cavity revolves, it passes to the position shown at B, at which point it passes under the liquid feed nozzle 53. The liquid feed nozzle 53 is held in position by the nozzle positioning bracket 54. As shown in Figure 4, the nozzle itself does not contact the surface of the gelatin film, but is positioned at sufficient distance therefrom so as to insure that no accidental contacts will occur. The nozzle may be placed well up into the bite of the roll, although this is not necessary. But it must feed at a point such that the liquid will not run out of the cavities. The liquid is fed through the liquid feed nozzle by a pump 55. This is a constant rate pump, which is designed to feed the liquid at a uniform rate. A gear pump is very satisfactory for this purpose. A separate pump and supply system is used for each row of cavities. It is desirable that an accurate gear pump, such as described in Patent 1,785,386 be used, so that the liquid will be fed at a uniform rate and any variations in viscosity, or other conditions, will not affect the rate of delivery of the pump.

The pump is best driven by the same drive means as is the rest of the machine, so that its rate of feed will be proportional to the rate of rotation of the cavity die roll. For flexibility, this rate may be variable as, for example, by means of a positive infinitely variable drive system, so that the rate may be adjusted to that which is desired for a particular run of capsules, and after the initial adjustment remain the same and without change.

As shown in Figure 4, the liquid pumped by the pump 55, through the nozzle 53, is discharged as a solid, continuous stream into the capsule cavities as these gelatin-lined cavities pass respectively underneath the nozzle. It is found that as no droplets are formed, the portion of the stream which passes into each cavity is the same, and the portion which lies upon the top of the gelatin film, between the cavities, has a tendency to flow into either the cavity preceding or the cavity following this raised portion; and in operation, the individual cavities have a substantially uniform charge.

It would appear that the gelatin cavities would contain different quantities of fluid by this type of operation. In the past, continuous machines have used a positive displacement so that each cavity will receive its own metered charge of fluid. We have found that this is totally unnecessary, and the much simpler, more effective procedures herewith described, are just as accurate, are far simpler, far more convenient, and far less susceptible to misadjustments or functional failure.

The partially liquid-filled capsule cavity passes, as shown in position C, forward up to position D. At position D, the solid contents of the capsule are placed in the gelatin-lined cavity containing the liquid. This occurs by the ejection of a powdered charge 56, from a charge chamber 57, in the powder measuring roll 58.

Powder feed

Substantially above the cavity die roll is located the powder measuring roll. The powder measuring roll 58 has a charge chamber 57 which cooperates with each of the capsule forming cavities in the cavity die roll. The roll may consist of a blank of approximately the same size as the cavity die roll, and rotates underneath a powder hopper 59, as shown in Figure 1. This powder hopper rides on the surface of the roll and has at its front a doctor, so that each of the chambers in the powder measuring roll is smoothed off uniformly filled as it passes from under the hopper. In the powder hopper, there may be a series of agitators 60, and if the hopper is deep, there may be a gas inlet 61, through which air, or an inert gas, is passed into the powder, so that the powder is agitated, aerated, and kept loose and fluffy; otherwise, the powders may tend to cake at the bottom of the hopper.

As shown in Figure 4, the surface of this roll has formed in its surface a series of charge chambers, each of which has such size and configuration that its contents will be the desired charge of powder for one of the capsule cavities. At the bottom of the charge chamber, there are a series of filters 62, connected to a manifold 63. These charge chambers, as they pass under the hopper are connected to reduced pressure through the manifold whereby powder is uniformly compacted into the charge chambers by the operation of the reduced pressure. The charge is then smoothed off by the front of the hopper, acting as a doctor; and by the use of the vacuum, is held in position in the charge chamber as it passes around with the roll until it is above the capsule die roll. At this point, air or other gas is caused to act through the filter which discharges the powder charge into the individual capsule forming cavity. Normally speaking, the powder charge will remain compacted as such, although it may, in the case of particularly free flowing powders break into a free powder during its release. The measuring roll valve plate 64 is similar in construction to the valve plate for the cavity die roll system, and it also has an angle bracket and positioning screws as shown in 65, as the positioning mechanism for the control of the exact point at which the powder is discharged.

Charge chamber cleaner

Figure 8:
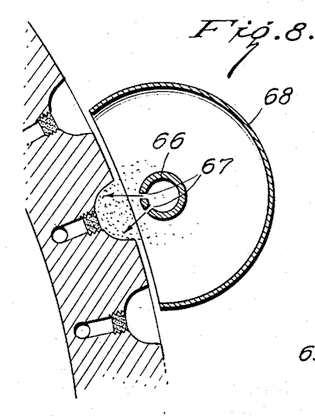
Figure 8 is a section view showing a portion of a powder measuring roll and the associated cleaning jet system.
Figure 9:
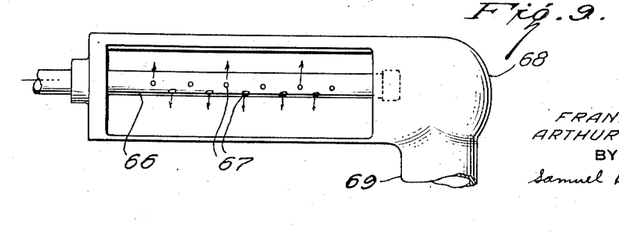
Figure 9 is a view showing the cleaner jet system which faces the powder measuring roll, viewed from the position of the powder measuring roll.
Figure 10:
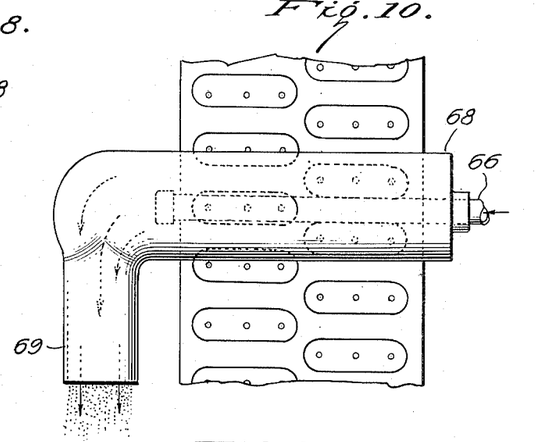
Figure 10 shows the cleaning jet system, assembled to the powder measuring roll.

Under some conditions, powder which is used may tend to cake, as for example, if cottonseed oil meal or other oily materials are used, and if permitted to cake, may tend to pack or aggregate in the charge chambers so that the charges will not be uniform. To prevent this, we found it desirable to equip the powder measuring roll with an air cleaner. As shown in Figures 8, 9 and 10, this cleaner consists of an air lance 66, which maybe a small pipe having therein nozzle openings 67, which may be diagonally arranged, which may be positioned closely adjacent to the surface of the charge chambers and the powder measuring roll, so that the jets of air, or other gas, are directed at such an angle into the powder measuring charge chamber as to hit tangentially at all portions of the chamber at some portion of its travel. These jets tend to loosen any powder which may aggregate and cause it to be dislodged and blown out of the charge chambers. The nozzle openings 67 may extend in any of various configurations to achieve this purpose, or a slot may be used. Certain configurations are as shown in Figures 8 and 9. To prevent particles of powder thus loosened from falling on to the web, or being discharged into the room, there is positioned about the air lance a vacuum shield 68. This shield is so positioned as to fit in close to the powder measuring roll, but without contacting it, so as to permit a minimum of leakage. At one end of this vacuum shield is a vacuum duct 69, which may lead to an ordinary household variety of vacuum cleaner or other source of vacuum, which so reduces the pressure within the vacuum shield that all powders and other loose particles are conveyed away from the surface of the wheel and into the vacuum system, where they may be then picked up by a cleaner bag, powder separator, or other form of device, or may be ejected to waste.

After the powdered charge is dropped into the individual capsule-forming cavities, as shown at D in Figure 4, the combined charges rotate, as shown at E and F, during the course of which the powder may partially absorb the oil over to the position of the seal.

Seal Roll

The seal roll 70 is a substantially smooth surfaced roll, as shown in Figure 1. This roll is designed to have the same peripheral speed as the cavity die roll and be pressed against the surface thereof by springs 73. As shown in Figure 1, the axle of this roll has a bearing mounted at each end thereof, which bearing is held in position by a positioning rod 71, which has pressing against the ends thereof an equalizer bar 72 and positioning spring 73. This tends to hold the seal roll tightly against the surface of the cavity die roll and allows for any minor variations in diameter, or changes due to temperature, the yielding of various parts, etc., and permits a smooth uniform rolling contact at the point of seal.

On the seal roll, there may be placed a thermostat, as shown diagrammatically at 74, controlling internal heater elements, as shown diagrammatically at 75, which in turn are connected through a slip ring system as shown diagrammatically at 76 to electrical lead 77. It is desired that the thermostat be adjustable, so that the temperature of the seal roll may be controlled as may be desired. It is desirable that two of the leads be power, and one be an indicator lead, so that an external means may be attached to show when the power is being supplied to the heat seal roll to increase the temperature. These controls are all conventional.

The seal roll 70 is normally operated so that it has a higher temperature than the remainder of the machine, whereby the cover strip 78 which may be coated by a mechanism similar to that shown for coating the lower strip, is fed over the seal rool 70 and by the seal roll fed towards the lower strip of gelatin containing the cavities. This action occurs as is shown diagrammatically in Figure 5.

Sealing Action

Figure 5:
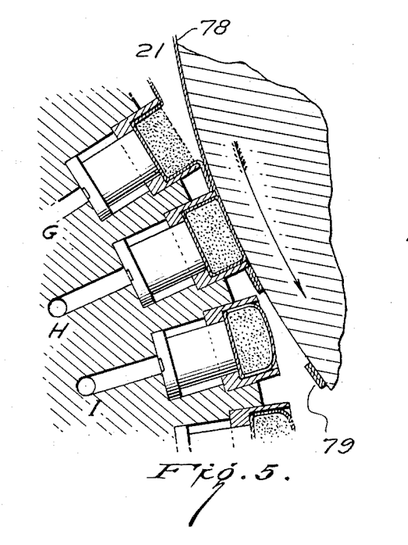
Figure 5 is a partial sectional view of the cavity die roll and the sealing roll, showing the action occurring at the point where the cover strip is placed over the capsule cavity and the capsule is cut out and formed.

As shown at G in Figure 5, the filled capsule cavity having the powder and as much liquid as may be desired therein, approaches a junction point with the cover strip 78. If the liquid content is such as to permit some flow, the convergence of the strips will cause the fill to flow back into the capsule cavities.

As the filled cavity travels forward from the position shown at G to the position shown at H, the sealing cover strip approaches and completely covers the top of the cavity. If some air remains therein, no harm is done with normal constituents. If the constituents are sensitive to air, an inert gas may be used to blanket this portion of the machine so that the inert gas only is sealed into the capsule. If accurately adjusted for capsule contents, it is possible to operate so that there is substantially no free space within the capsule but this normally is not necessary.

The cover strip moves down against the capsule cavity as the two rolls approach the point of tangency or bite, and are brought into contact with each other, at which point the capsule contents are substantially then isolated; and as the roll continues to rotate towards the point of tangency, the cutting-out rim is forced upwardly through the two layers of strip material; and because of the soft characteristics of the material, cuts into them, effectively severing them completely. It is a characteristic of a gelatin film, and similar materials, when so cut, to unite with the adjacent film, thereby giving a uniform seal around the periphery of the capsule cavity, so that at the point shown at H, the leading edge of the capsule is completely sealed and the trailing edge substantially so. As the capsule, as it may now be called, approaches the point marked I, and as the rolls separate, the residual web as shown at 79 may be separated from the formed capsule. The two portions of the strip in the web are usually united to each other around the periphery of the cutout.

For the separation of the capsules from the web, we have found it desirable to retain the capsules in their forming cavities and cause the web to be drawn against the surface of the sealing roll, and thus separate the two.

For best results in getting a uniform seal, and this is particularly important with the long oval type, the vacuum holding the strips which are forming the capsules should be released at the point of seal so that the only forces acting are the cutting out edges and the natural surface tension of the strip. If the vacuum is allowed to remain effective at this point, it may non-uniformly affect the gelatin, so that the capsules as formed are not as straight, nor as symmetrical as is the case when the vacuum is released. The gap at 47 in the valve plates permits this release at the point of seal. To assist in separating the newly formed capsule from the strip, it is desirable that the vacuum be immediately reapplied, so as to cause the capsule to remain flat against the bottom of its forming die, while the residual web is removed and discarded. The initial separation is shown at I in Figure 5. As shown further in Figure 1, the residual web may be run over an idler roll 80 and between take-off rolls 81, and then discarded. The take-off rolls are preferably driven at a substantially higher surface speed than is the remainder of the mechanism, so that the web is stretched, assisting in causing the complete and smooth separation of the residual web from the capsules. The web from the take-off rollers may be run to discard or may be reworked to salvage the strip material.

The capsule forming cavities with the capsules held flat therein by vacuum move to the discharge point, as shown in Figure 6.

Capsule ejector system

As shown in Figure 1, the capsule ejector system consists of a shield 82, which may well be of a transparent material, enclosing a portion of the cavity die roll. As shown in Figure 6, the vacuum continues to operate through the manifold passages at this point; so that as shown at J, if the capsule is held against the bottom of the capsule die cavity by the vacuum, at K the vacuum is broken and the capsule permitted to attain a partially rounded shape by the action of the stresses within the gelatin film. As shown at L, air pressure from the pressure chest 48, operating under the piston, raises the plugs so that the surface of the plugs are approximately level with the top surface of the cavity die cutting edges, which forces the formed capsule outward and causes it to drop. If for any reasons the capsules tend to stick to the surface of the roll, there is a rotating stripper 83, which has blades of, for example, soft fabric travelling at a higher rate of speed than the surface speed of the cavity die roll, which strike the capsules and aid in releasing them. The capsules fall by gravity, aided by air flow, to the bottom part of the shield.

Pneumatic conveyor

Figure 16:
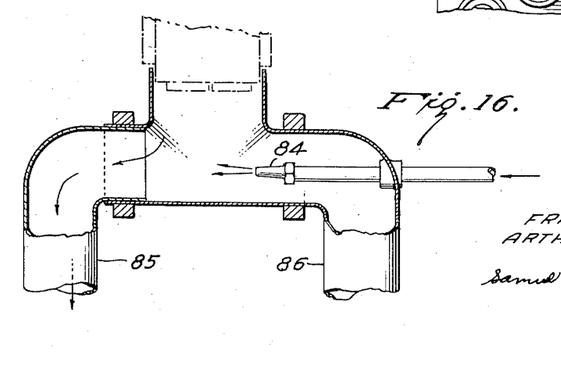
Figure 16 is a view of an air conveyor system for transferring the capsules, after their ejection, to a desired location.

At the bottom of this shield, or the points to which the capsules would normally travel by gravity, there is shown a jet ejector system, consisting of a jet 84 near the center of a larger conveyor 85. Air under pressure operating through the jet ejector 84 causes the entire air system in the lower part of this shield to move in the direction of flow of the jet. The conveyor 85 is a larger diameter pipe, in which the jet causes air flow. To allow sufficient air, an air duct 86 provides a larger volume of air at a lower pressure to serve as a carrier. The jet 84 should have sufficient pressure so that all of the air in the shield tends to be drawn towards the conveyor duct 85, so as to prevent a raised pressure area, which would tend to blow the capsules out around any leaks. By having the entire system under reduced pressure, due to the jet 84, all capsules are drawn by the motion of air towards the lower portion of the shield and into the conveyor duct 85. The conveyor duct 85 may be a pipe with an elbow directed as desired, so that the capsules being carried by the air blast are caused to tumble and be agitated and moved at high speed in a desired direction. The tumbling action has a tendency to cause the capsules to become rounded and to break up any powder which may cake in the capsules, so that the skin stress will round the capsule to a symmetrical configuration. Also, the tumbling effect and the cooling and drying effect of the air blast permits the capsule surface to become slightly harder, so that it will not stick to adjacent capsules when discharged. Several jets may be used, or all of the air may feed through the ejector jet 84, if slightly constricted as in a Venturi tube.

We have found it convenient for this air conveyor to be discharged into either a drying pan or pill coating machine, whereby the capsules may be additionally tumbled as they are dried. The capsules, as they are dried, attain a comparatively hard, smooth coat, so that they may be packaged in accordance with standard pharmaceutical procedures. The treatment of the capsules from this point onward may be in accordance with conventional procedures, or as desired.

Figure 13:
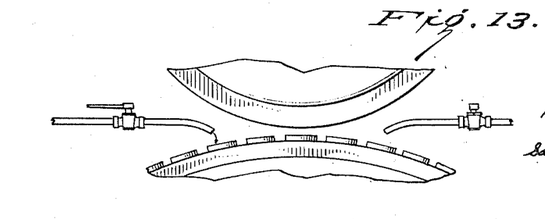
Figure 13 shows a modification of the machine in which the powder measuring roll is of a different size than the cavity die roll, and shows two different liquid feeding nozzles which may be used individually or in cooperation to feed at least one liquid into the individual chambers.

It is to be understood that the machine may be constructed so that it appears considerably different from that here shown without in effect varying from the scope of our invention. As shown in Figure 13, for example, the charge measuring wheel may be considerably smaller than the cavity die rolls provided, of course, that a cavity is adapted to pass under, and receive each charge from the charge roll at the point of transfer. Also as shown in Figure 13, the liquid may be filled into the capsule cavity either before or after the powder, or if desired, liquids may be fed in both locations so that two different liquids, as for example, two immiscible liquids, may be discharged into the cavities and filled into the capsules. This would permit two immiscible liquids and a powder each to be accurately measured into the individual capsules for consumption. If a smaller powder measuring roll is used, and a smaller sealing roll is used, the seal roll may be placed higher up around the periphery of the cavity die roll, so that there is less tendency for the contents of the cavity to flow out. This is of particular interest if a comparatively large proportion of liquid is to be used.

The capsule cavity inserts may have some taper in the inside walls which assists somewhat in releasing the capsules, but normally the cylindrical shape is preferred because it is easier to manufacture.

With the exception of the gelatin web take-off rolls 80 and 81, all of the gelatin contact rolls are power driven and so connected that the surface speeds of all rolls is the same. If desired, the speeds of the various rolls may vary slightly because the plastic nature of the gelatin strip will take up minor variations. The gelatin to the roll may be stretched somewhat if desired, so as to alter the final shape of the capsules as a result of the residual stresses thereby induced. The seal roll 70 may have vacuum ports to assist in positioning the gelatin film; or may have slight depressions to relieve the surface opposite each cavity so as to provide room for slight relief of the capsule contents at the time of seal, as otherwise the cavity can be only partially filled, as room must be provided into which the covering layer may be displaced while the cutting edge is cutting out and severing the sheet portions forming the capsule. Such modifications cause complications in the timing of the rolls and are normally not used.

Operation

In a room maintained at 68–70° F. with relative humidity of 50%, a film of gelatin was cast which was approximately 0.031″ thick as stripped from a casting roll. The outer surface of the lower strip of gelatin was coated with mineral oil. The upper strip was not coated, to prevent skidding on the seal roll. The inner surface of both strips was coated with a 5% solution of gum sandarac in chloroform. The gelatin film was passed over the surface of the cavity die roll and thereinto was placed an oil containing 1,000,000 units per gram of vitamin A and 50,000 units per gram of vitamin D in a predominantly cottonseed oil base. A powdered charge containing for each capsule 6 milligrams of thiamin hydrochloride, 2 milligrams of riboflavin, 20 milligrams of niacinamide, 2 milligrams of calcium pantothenate, 1 milligram of pyridoxine hydrochloride, 150 milligrams of ascorbic acid and 5 milligrams of folic acid, was prepared. The oil feed pump was adjusted so that 10,000 units of vitamin A and 1,000 units of vitamin D in oil were placed in each cavity of the gelatin strip. The seal roll was adjusted to a temperature of 95° F. and the capsules were formed rapidly, uniformly, and satisfactorily. The capsules were tumbled for half an hour in a tablet coating pan. After additional drying in trays in a room at a temperature of about 70° F. and a relative humidity of 35%, the capsules were found to be smooth, uniform, and satisfactory.

Multitudinous variations in size, shape, form, and description of the capsules may be made; round, elliptical, spherical, etc. Many such sizes and shapes are shown in the prior art and by the cutting of our cavity inserts to the desired shape, it is found possible to form small, large, or shaped capsules, as may be required for a particular application.

The quantity of liquid and powder may be varied over wide limits. The liquid feed may be disconnected and powder only filled into the capsule. As some oil is absorbed by certain powders, the same quantity of powder may be used to fill the capsule shell whether or not some oil is used. The coating on the inside of the capsules may be changed, depending upon contents. For instance, 25% gum mastic in ethyl alcohol provides an excellent coating for chemicals which react with the gelatin shell.

Having thus described certain modifications thereof, as our invention we claim:

1. A method for the manufacture of single-compartment soft gelatin capsules containing both a liquid and a powder, that comprises successively forming a series of cup-shaped cavities in a gelatin strip by the localized application of subatmospheric pressure to one side only of successive portions of said gelatin strip, moving the strip containing the thus formed cavities uniformly under continuous and uniform discharge of a liquid, said liquid being discharged at a rate proportional to the rate of movement of said strip and in such quantity that all of the liquid is filled into the cavities, depositing in each of the cavities a pre-measured charge of a powder, continuously bringing into juxtaposition with the cavity-containing film a substantially smooth second film of gelatin, thereby covering the filled cavities, and successively cutting out by pressure portions of each sheet forming the filled cavities whereby the thus cut out portions are peripherally united to each other, separating the thus formed capsules from the remainder of the strips, and permitting the thus formed capsules to attain a substantially rounded symmetrical configuration.

2. A method of forming symmetric capsules in asymmetric dies containing both a liquid and a powder, which comprises subjecting two gelatin films to two different heat treatments, forming a series of empty capsule shells by the localized application of subatmospheric pressure to successive portions of one side only of one strip only, passing the thus formed shells uniformly and continuously under a uniformly and continuously flowing stream of liquid, said liquid being discharged at a rate proportional to the rate of movement of said strip and in such quantity that all of the liquid is filled into the cavities, depositing a premeasured charge of a powder in each successive shell, placing the other of said films uniformly and continuously in juxtaposition to the first of said films, sealing the periphery of the portions of the films enclosing the contents of the shells to each other by the localized application of pressure which combines the sealing of the films with the cutting out of the desired portions from the films, separating the cut out capsules thus formed from the residue of the films, and permitting the strains induced in the formation to modify the gelatin walls of the capsule to the desired shape.

3. A method for the manufacture of plastic capsules filled with pre-determined portions of substances supplied partly in liquid form and partly in powder form which comprises supplying a first plastic strip, uniformly and continuously advancing said strip, uniformly and continuously coating the side of said strip which is to form the inside of the capsules with a protective coating, uniformly and continuously forming a series of cup-shaped cavities in said strip, premeasuring and preshaping powder charges to fit without distortion into said cup-shaped cavities, depositing separately in each of said cavities at points spaced along the path of travel of said strip, said premeasured preshaped charges of powder, and uniform portions of liquid from a uniformly and continuously flowing source of liquid, uniformly and continuously supplying a second plastic strip, uniformly and continuously coating the surface of said second strip which is to form the inside surface of the capsule with a protective coating, juxtapositioning said second strip to cover the filled cavities, and uniformly and continuously uniting said strips around the peripheries of said cavities and severing the thus formed filled cavities from said strip, and permitting the strains induced in the cut-out portions of the films to modify the thus formed capsules to the desired shape.

4. A method of manufacturing plastic capsules filled with predetermined portions of substances supplied partly in liquid form and partly in powder form, said method comprising: uniformly and continuously advancing a first plastic strip, forming cup-shaped cavities in said strip, depositing the capsule contents in said cavities, bringing a second plastic strip, also advanced uniformly and continuously, into juxtaposition with said first strip to cover the filled cavities, uniting said strips around the peripheries of said cavities, and severing the thus formed filled capsules from said strips, characterized by moving the strip containing said cavities uniformly and continuously under a continuous and uniform discharge of liquid said liquid being discharged at a rate proportional to the rate of movement of said strip and in such quantity that all of the liquid is filled into the cavities, separately premeasuring and preshaping portions of powder, and separately depositing a premeasured, preshaped charge of powder in each cavity in said strip, at points spaced along the path of advance of said first strip.

References Cited in the file of this patent

UNITED STATES PATENTS

| | | |
|---|---|---|
| 483,663 | Warren | Oct. 4, 1892 |
| 730,643 | Hance | June 9, 1903 |
| 1,273,849 | Girtanner | July 30, 1918 |
| 1,842,276 | Leone | Jan. 19, 1932 |
| 1,877,628 | Replogle | Sept. 13, 1932 |
| 2,055,577 | Huff | Sept. 29, 1936 |
| 2,294,633 | Scherer | Sept. 1, 1942 |
| 2,323,581 | Weckesser | July 6, 1943 |
| 2,403,265 | Craig | July 2, 1946 |
| 2,455,980 | Dallas et al. | Dec. 14, 1948 |
| 2,497,212 | Donofrio | Feb. 14, 1950 |
| 2,513,581 | Moule | July 4, 1950 |
| 2,513,852 | Donofrio | July 4, 1950 |
| 2,527,466 | Townsend et al. | Oct. 24, 1950 |
| 2,546,059 | Cloud | Mar. 20, 1951 |
| 2,549,327 | Moule | Apr. 17, 1951 |
| 2,600,222 | Donofrio | Jan. 10, 1952 |